United States Patent
Letunov et al.

(10) Patent No.: US 8,218,679 B2
(45) Date of Patent: Jul. 10, 2012

(54) METHOD AND SYSTEM FOR CREATING QUADRATURE MODULATION SIGNAL CONSTELLATIONS WITH ARBITRARY SPECTRAL EFFICIENCY

(75) Inventors: Leonid Letunov, Gomel (BY); Aleksandr Grigorjev, Gomel (BY)

(73) Assignee: Modesat Communications OÜ, Tallinn (EE)

( * ) Notice: Subject to any disclaimer, the term of this patent is extended or adjusted under 35 U.S.C. 154(b) by 615 days.

(21) Appl. No.: 12/405,655

(22) Filed: Mar. 17, 2009

(65) Prior Publication Data

US 2009/0232253 A1 Sep. 17, 2009

Related U.S. Application Data

(60) Provisional application No. 61/037,053, filed on Mar. 17, 2008.

(51) Int. Cl.
*H04L 27/36* (2006.01)

(52) U.S. Cl. .......................... 375/298; 375/296

(58) Field of Classification Search ................. 375/298, 375/295, 296
See application file for complete search history.

(56) References Cited

U.S. PATENT DOCUMENTS 6,674,811 B1 * 1/2004 Desrosiers et al. ........... 375/298

OTHER PUBLICATIONS

CDM-710 Broadcast Satellite Modem, Installation and Operation Manual, Part No. MN/CDM710.IOM Revision 7, Jun. 2007, Table 8-2, p. 8-8.
European Standard for Digital Video Broadcasting (DVB) ETSI EN 302 307 V1.1.1 (Mar. 2005).

* cited by examiner

*Primary Examiner* — Chieh M. Fan
*Assistant Examiner* — Freshteh N Aghdam
(74) *Attorney, Agent, or Firm* — Houston Eliseeva, LLP

(57) ABSTRACT

Methods, systems, transmitters, and receivers implement and use Quadrature Amplitude Modulation QAM2N modulation types and constellations, where N is a real number, e.g., 1.5; 1.33; 2.5; 3.5. The methods, systems, transmitters, and receivers use constellations with the number of points on the circle not equal to a power of two, sending QAM signals of zero power together with other QAM signals, and/or sending sequences of QAM signals of different types.

5 Claims, 3 Drawing Sheets

METHOD AND SYSTEM FOR CREATING QUADRATURE MODULATION SIGNAL CONSTELLATIONS WITH ARBITRARY SPECTRAL EFFICIENCY

RELATED APPLICATIONS

This application claims the benefit under 35 USC 119(e) of U.S. Provisional Application No. 61/037,053, filed Mar. 17, 2008, which is incorporated herein by reference in its entirety.

BACKGROUND OF THE INVENTION

The invention is in the field of communication technology and more particularly, relates to methods for providing improved capacity of the communication channels.

Quadrature Amplitude Modulation (QAM) is used for transmitting information by transmitting two modulated carrier waves over a channel: for example, electromagnetic waves in space or over a wire or light waves over an optical fiber (note that the light waves are also electromagnetic waves). These two carrier waves (in-phase carrier and quadrature carrier) have the same carrier frequency and a phase difference of 90°.

The modulation of the in-phase and quadrature carrier waves at each time may be represented as a point on an I-Q plane (which may be considered a complex plane for various purposes). By selecting several points or regions on the I-Q plane and modulating the carrier waves so that they end up at different moments in different points or within different regions on the I-Q plane, binary or digital information may be represented and transmitted.

Such sets of points or regions are called constellations. Each point (or a complex number) in a constellation may be called a symbol and may represent one or several bits.

For signal constellations of the type $QAM2^{N_0}$, where QAM is Quadrature Amplitude Modulation and $N_0$ is the efficiency of the signal constellation in bits per 1 Hz of bandwidth, $N_0$ may be any positive integer; for $QAM2^{N_0}$, $2^{N_0}$ is the number of points in the constellation.

Quadrature Amplitude Modulation of the type $QAM2N_0$ may be used in different varieties and under different names. For binary phase-shift keying (BPSK), $N_0$ is 1; for quadrature phase-shift keying (QPSK), $N_0$ is 2; for 8PSK (phase-shift keying), $N_0$ is 3; for QAM16 and for asymmetric phase-shift keying (APSK16), $N_0$ is 4; etc.

The ideal spectral efficiency for communication channels deploying these modulation types in combination with LDPC+BCH coding is introduced in European Standard for Digital Video Broadcasting (DVB) ETSI EN 302 307 V1.1.1 (2005-03), page 33.

In practice, the transmission efficiency, for example, in modems such as DVB-S2 modems, is somewhat inferior due to impairments including the effects of linear and non-linear distortion (see, for example, CDM-710 Broadcast Satellite Modem, Installation and Operation Manual, Part Number MN/CDM710.IOM Revision 7, June 2007, Table 8-2, p. 8-8).

SUMMARY OF THE INVENTION $QAM2^N$ modulation types and constellations, where N is a real number, e.g., 1.5; 1.33; 2.5; 3.5, etc, improve spectral efficiency.

These modulation types have particular advantages for satellite communications. Some modulation schemes such as QPSK and 8PSK have a constellation diagram with points situated on one circle in the I-Q plane. For example, QPSK presents 4 points and 8PSK includes 8 points situated on the same circle. This invention uses constellations with, for example, three points on the circle ($QAM2^{1.5}$), six points on the circle ($QAM2^{2.5}$), 12 points on the circle ($QAM2^{3.5}$), etc.

When constellation points are placed on the same circle, the non-linear distortion effects caused by a satellite transponder have the least influence. Thus the possible range of signal constellations and the spectral efficiency over satellite communication channels are improved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The modulation schemes according to the invention can be formed by a variety of methods and devices. $QAM2^{1.5}$ and $QAM2^{2.5}$ are used as examples.

Method 1

Three pairs of bits are transmitted through a QPSK channel followed by a symbol with zero power. The average spectral efficiency is 1.5 bit for 1 Hz, or $QAM2^{1.5}=QAM2.83$. The total signal power 4 P is transmitted in the three pairs of bits (since the fourth symbol does not consume power). The average power remains unchanged while the power for each pair of bits increases by 33% (1.25 dB).

This change from QPSK to QAM2.83 on the receiver side produces a gain in signal to noise ratio of 1.25 dB provided that the receiver ignores or discards the symbols with zero power. The efficiency of this transmission is 1.5 bit per a QPSK symbol (as opposed to 2 bit per symbol under QPSK), however, the capacity of the communication channel may be increased. For instance, for spectral efficiency equal to 0.5 bit per 1 Hz with ¼(LDPC+BCH) coding, the signal to noise ratio is −2.35 dB. QAM2.83 provides for the spectral efficiency of 0.5 bit per 1 Hz using ⅓(LDPC+BCH) coding with signal to noise ratio −1.24 dB. Since the power for each pair of bits increases by 1.25 dB, the actual threshold for QAM2.83 is equal to −2.49 dB, which is 0.14 dB greater than −2.35 dB for QPSK.

Method 2

Another method of producing QAM2.83 is alternating the QPSK and the BPSK modulation schemes: the first pair of bits uses QPSK; the second pair of bits uses the BPSK; the third pair, the QPSK; the fourth pair, the BPSK; etc.

Since in the two pairs of bits the power must be equal to 2 P, it is redistributed so that the first pair of data samples has an increased power of 1.333 P while the second pair has a decreased power of 0.666 P, the minimum distance between symbols on the I-Q plane being equal for all symbols in the transmission.

Method 3

This method of creating QAM2$^{1.5}$=2.83 uses a constellation with three points on a circle. Transmission of each symbol carries the same amount of power.

Figure 1:
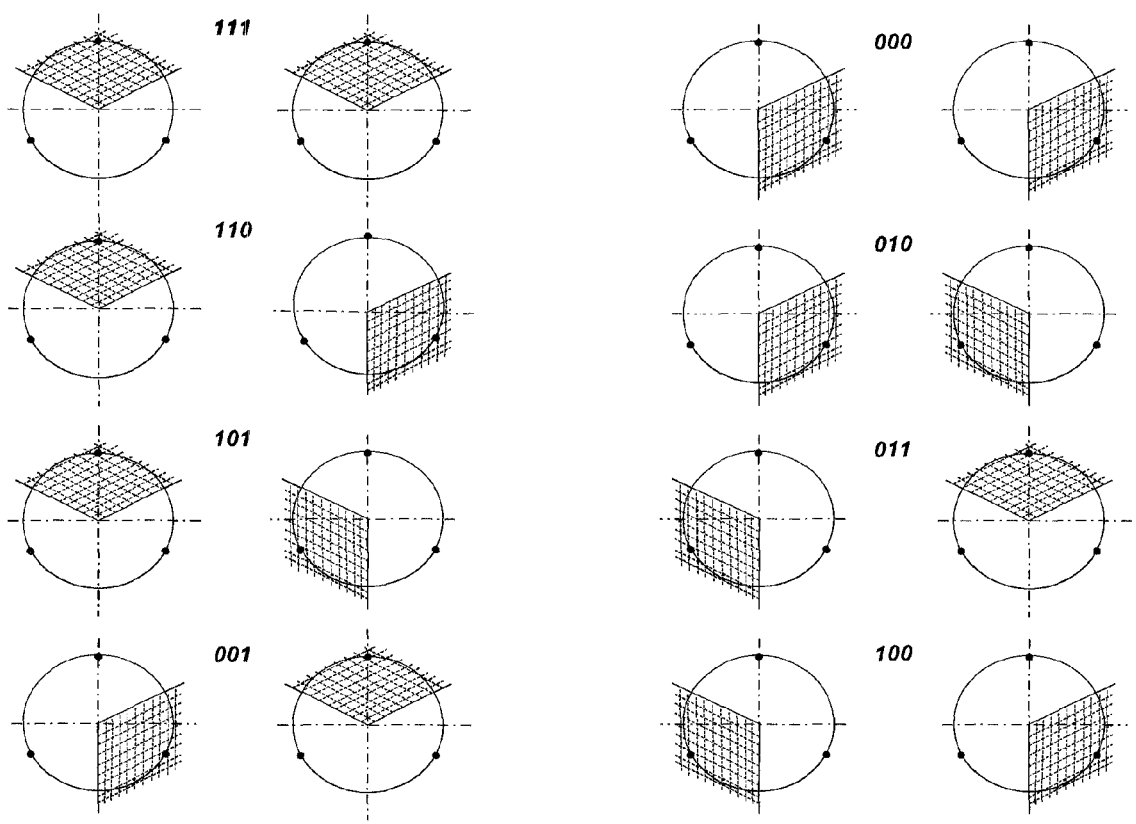
FIG. 1 depicts constellation diagrams for forming pairs of symbols, each pair containing three bits.

This method involves forming pairs of symbols, each pair representing three bits. As shown in FIG. 1, each symbol uses a constellation of three points on the I-Q plane with three points, each pair of symbols allowing nine combinations of these points. For communicating three bits, only eight combinations out of nine are used. The distance between the points on the unit circle on the I-Q plane is equal to 1.73 compared to 1.41 for QPSK, which corresponds to a 1.8 dB improvement in the signal to noise ratio and a loss from 2 to 1.5 bits per Hz in the spectral efficiency.

Figure 2:
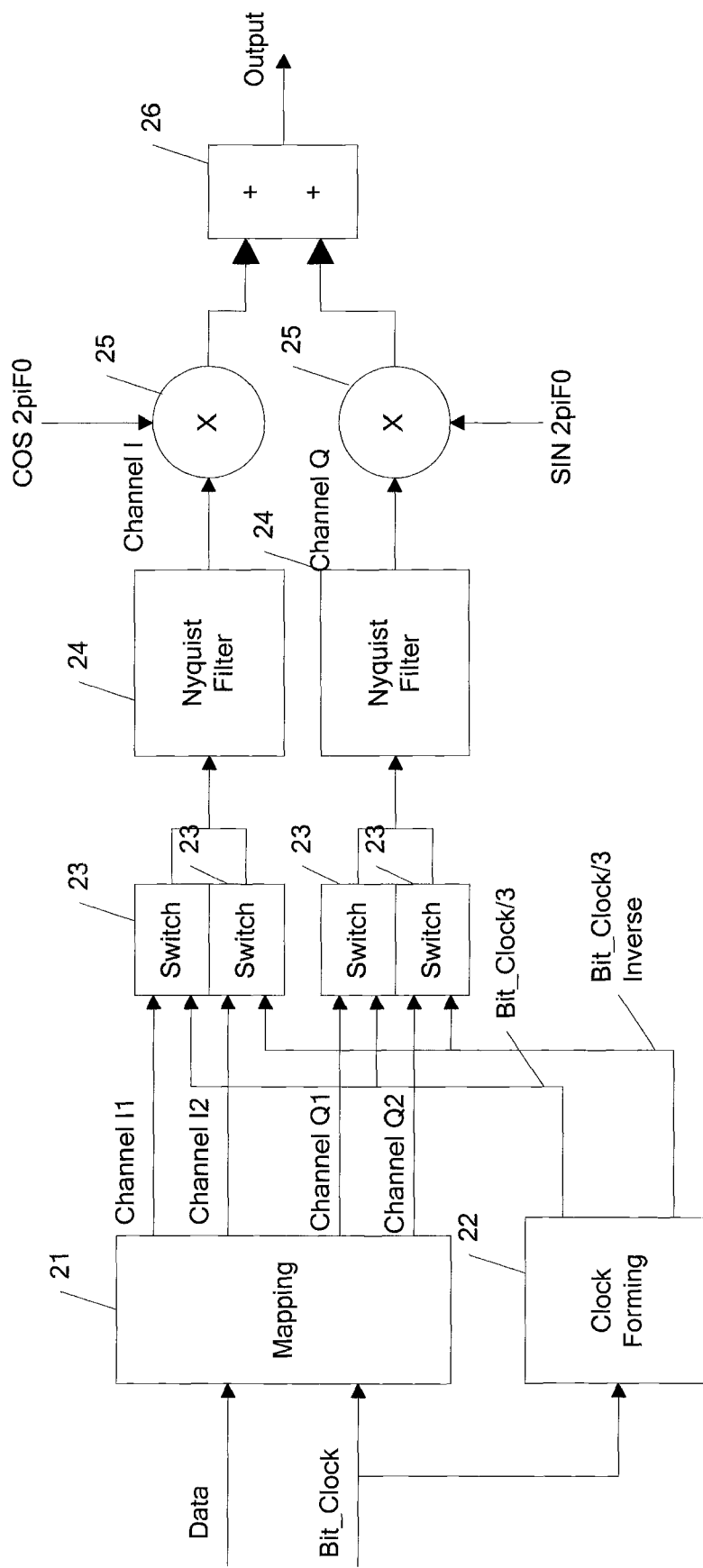
FIG. 2 shows the functional diagram of a transmitter using quadrature modulation signal constellations with spectral efficiency of 1.5 bit/Hz according to an embodiment of the invention.
Figure 3:
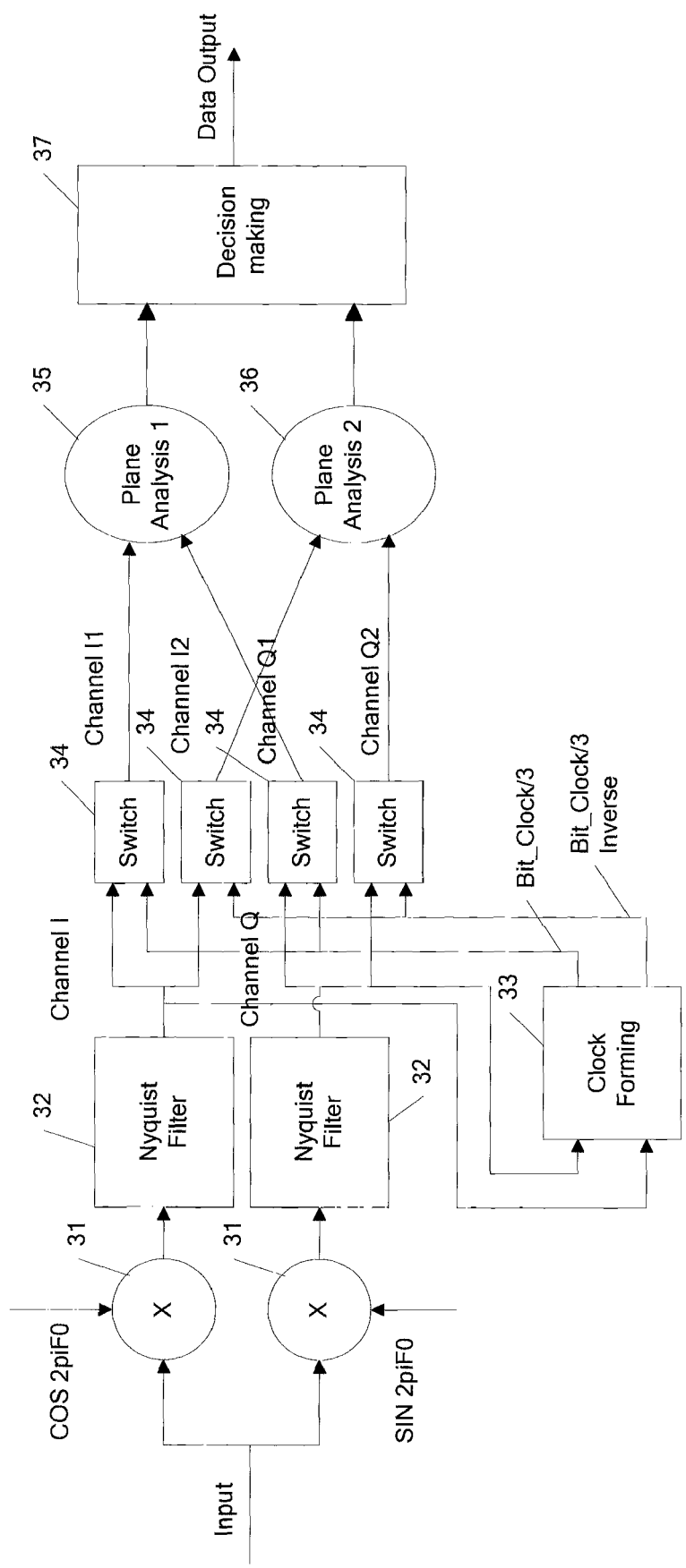
FIG. 3 shows the functional diagram of a receiver using quadrature modulation signal constellations with spectral efficiency of 1.5 bit/Hz according to an embodiment of the invention.

FIG. 2 shows a transmitter and FIG. 3 shows a receiver using quadrature modulation signal constellations with a spectral efficiency of 1.5 bit/Hz according to Method 3.

In FIG. 2, the data bit sequence at clock frequency of $F_b$ is input to the mapping unit 21, which maps each input block of 3 bits onto two pairs of symbol samples at a clock frequency of 2*$F_b$/3. Each pair can accept one of three values of normalized coordinates on the constellation plane: (0; 1), (−0.5; −0.866), (−0.5; 0.866). Switching of the pairs of symbol samples is carried out by means of the switches 23, operated by the clock generation unit 22. In this way consecutive transfer of two pairs of symbol samples is carried out. The Nyquist filter units 24 form the transmit spectrum in traditional ways, while multiplier units 25 and an adder unit 26 shift the spectrum to the intermediate or carrier frequency.

In FIG. 3, multipliers 31, Nyquist filters 32 and a clock unit 33 of the receiver may be implemented in a variety of ways known in the art. The same is true for carrier and clock frequency synchronization, and for the synchronization of the two pairs of symbol samples (i.e., frame synchronization). Switches 34 separate the pairs of samples of each phase plane, and the analysis of planes 1 and 2 is carried out in plane analysis units 35 and 36. In the decision-making unit 37, the final decision on the accepted combination of bits is made. The plane analysis units may be a part of any device for decoding a forward error correction code.

Similarly to QAM2$^{1.5}$, other constellations may be generated. For example, for QAM2$^{2.5}$=QAM5.62, according to Method 1 above, the signal constellation 8PSK is used. Five pairs of data samples are transmitted as 8PSK and then instead of the sixth pair, zero power is transmitted.

For generating QAM2$^{2.5}$ according to Method 2, pairs of data samples modulated as 8PSK are alternated with pairs of data samples modulated as QPSK. The power for each modulation scheme needs to be redistributed between 8PSK and QPSK so that the minimum distance between the constellation points is equal for both modulation schemes.

For generating QAM2$^{2.5}$ according to Method 3, every pair of samples contains a signal constellation with six points evenly distributed on the unit circle in the I-Q plane. Therefore, the two pairs of data samples allow 36 data combinations of six points. With four combinations excluded, 32 combinations are left, which corresponds to five bits in two pairs of samples and provides a spectral efficiency of 2.5 bit per 1 Hz.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data transmission system, comprising
a device for QAM2$^N$ transmission, the device transmitting electromagnetic waves modulated to represent a sequence of symbols comprising:
QAM2$^{N_0}$ data symbols encoding a sequence of bits and zero-power symbols,
wherein $L_0$ zero-power symbols are transmitted by the device for every $L_s$ QAM2$^{N_0}$ data symbols transmitted by the device,
wherein $L_0$, $L_s$, and $N_0$ are positive integer numbers, and wherein $$N = N_0 \cdot \frac{L_S}{L_S + L_0}.$$

2. The system as in claim 1, further comprising
a device receiving the electromagnetic waves and recovering the sequence of bits by discarding the zero-power symbols.

3. A data transmission system, comprising:
a device partitioning a data bit sequence into n segments;
a device associating each segment with a predetermined positive integer number
a device mapping each associated segment into a symbol of type QAM2$^{N_{oi}}$; and
a device integrating each of said symbol sequences corresponding to the n segments into a unified symbol sequence of type QAM2$^N$,
wherein $$N = \frac{\sum_{i=1}^{n} N_{oi} \cdot L_i}{\sum_{i=1}^{n} L_i},$$

i is the segment number, $L_i$ is the number of bits in each segment, and n is the number of data symbol segments.

4. A data transmission system, comprising:
a device mapping every group of k bits of a data bit sequence to be transmitted, where k is an odd integer greater than 1, into a signal constellation with uniformly distributed points over n circles of equal radius, wherein each point on the circle is described by a pair of symbol samples in the Q-channels by
selecting an integer n;
calculating the number of points on each circle m as $$\sqrt[n]{2^k}$$

and rounding upwards to the nearest integer; and
selecting $2^k$ permitted combinations from the potential number $m^n$ combinations.

5. The data transmission system as in claim 4, wherein m is 3, n is 2, and k is 3.

* * * * *